US011334069B1

(12) United States Patent
Buerger et al.

(10) Patent No.: US 11,334,069 B1
(45) Date of Patent: May 17, 2022

(54) SYSTEMS, METHODS AND COMPUTER PROGRAM PRODUCTS FOR COLLABORATIVE AGENT CONTROL

(71) Applicant: National Technology & Engineering Solutions of Sandia, LLC, Albuquerque, NM (US)

(72) Inventors: Stephen Buerger, Albuquerque, NM (US); Joshua Alan Love, Redondo Beach, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 145 days.

(21) Appl. No.: 15/446,772

(22) Filed: Mar. 1, 2017

Related U.S. Application Data

(63) Continuation-in-part of application No. 14/258,986, filed on Apr. 22, 2014, now Pat. No. 10,168,674.

(60) Provisional application No. 61/814,717, filed on Apr. 22, 2013, provisional application No. 62/301,943, filed on Mar. 1, 2016.

(51) Int. Cl.
*G05D 1/00* (2006.01)
*H04L 41/046* (2022.01)
*G05B 15/02* (2006.01)

(52) U.S. Cl.
CPC ......... *G05D 1/0088* (2013.01); *H04L 41/046* (2013.01); *G05B 15/02* (2013.01); *G05D 1/0077* (2013.01); *H04L 41/048* (2013.01)

(58) Field of Classification Search
CPC combination set(s) only.
See application file for complete search history.

(56) References Cited

U.S. PATENT DOCUMENTS

| | | | |
|---|---|---|---|
| 6,122,572 A | 9/2000 | Yavnai | |
| 7,266,532 B2 | 9/2007 | Sutton et al. | |
| 8,494,689 B1 | 7/2013 | Ashton | |
| 8,947,522 B1 * | 2/2015 | Hickman | H04N 7/18 |
| | | | 348/114 |
| 2004/0162638 A1 | 8/2004 | Solomon | |
| 2006/0079997 A1 | 4/2006 | McLurkin et al. | |
| 2006/0265103 A1 | 11/2006 | Orita | |
| 2007/0021880 A1 | 1/2007 | Appleby et al. | |
| 2007/0168057 A1 | 7/2007 | Blevins et al. | |
| 2008/0004749 A1 | 1/2008 | Hostettler | |

(Continued)

OTHER PUBLICATIONS

Bertuccelli, L. F. et al., "Robust Planning for Coupled Cooperative UAV Missions," 43rd IEEE Conference on Decision and Control (2004), Dec. 14-17, Atlantis, Paradise Island, Bahamas, pp. 2917-2922.

(Continued)

*Primary Examiner* — Rachid Bendidi
(74) *Attorney, Agent, or Firm* — Daniel J. Jenkins

(57) ABSTRACT

Systems, methods and unmanned agents for collaboratively controlling agents in a collaborative network by one or more agents continuously simulating numeric models of one or more other agents in the network to dramatically reduce the computational bandwidth required between agents, and improve the quality of shared estimates of the agent locations as well as the locations and characteristics of other objects of interest, e.g. targets. Bandwidth is reduced by using the models to intelligently filter data before communicating.

14 Claims, 8 Drawing Sheets

(56) References Cited

U.S. PATENT DOCUMENTS

| | | | |
|---|---|---|---|
| 2008/0009969 A1 | 1/2008 | Bruemmer et al. | |
| 2008/0215204 A1 | 9/2008 | Roy et al. | |
| 2009/0064169 A1 | 3/2009 | Nguyen et al. | |
| 2009/0222149 A1 | 9/2009 | Murray et al. | |
| 2009/0306823 A1 | 12/2009 | Baltes et al. | |
| 2009/0326735 A1* | 12/2009 | Wood | G05D 1/0088 701/2 |
| 2010/0217438 A1 | 8/2010 | Kawaguchi et al. | |
| 2010/0332281 A1 | 12/2010 | Horvitz et al. | |
| 2011/0054684 A1 | 3/2011 | Seo et al. | |
| 2011/0283285 A1 | 11/2011 | Saad et al. | |
| 2012/0290152 A1* | 11/2012 | Cheung | G01S 7/003 701/2 |
| 2013/0123980 A1 | 5/2013 | Seo | |
| 2014/0074339 A1* | 3/2014 | Casado | G05D 1/0088 701/24 |
| 2014/0108663 A1 | 4/2014 | Peters et al. | |
| 2014/0229221 A1 | 8/2014 | Shih et al. | |
| 2014/0236391 A1 | 8/2014 | Wood et al. | |
| 2014/0249693 A1 | 9/2014 | Stark et al. | |
| 2014/0298231 A1 | 10/2014 | Saito et al. | |
| 2014/0316616 A1* | 10/2014 | Kugelmass | G05D 1/101 701/8 |
| 2016/0059962 A1* | 3/2016 | Abuelsaad | G05D 1/106 701/3 |

OTHER PUBLICATIONS

Buerger, S. P. et al., "A Layered Control Architecture for Single-Operator Control of Heterogeneous Unmanned System Teams," Proc. of SPIE (2012) 8387:838702-1-838702-12.

Dias, M. B. et al., "Market-Based Multirobot Coordination: A Survey and Analysis," Proceedings of the IEEE (2006) 94 (7):1257-1270.

Feddema, T. J. et al., "Decentralized Control of Cooperative Robotic Vehicles: Theory and Application," IEEE Transactions on Robotics and Automation (2002) 18(5):852-864.

Ryan, A. et al., "Decentralized Control of Unmanned Aerial Vehicle Collaborative Sensing Missions," Proceedings of the 2007 American Control Conference (2007) Marriott Marquis Hotel at Times Square, New York City, USA, Jul. 11-13, 6 pages.

Sandholm. T., "Algorithm for optimal winner determination in combinatorial auctions," Artificial Intelligence (2002) 13:1-54.

Sujit, P. B. et al., "Distributed Sequential Auctions for Multiple UAV Task Allocation," Proceedings of the 2007 American Control Conference (2007) Marriott Marquis Hotel at Times Square, New York City, USA, Jul. 11-13, 6 pages.

Vincent, R. et al., Distributed multirobot exploration, mapping, and task allocation, Ann Math Artif Intell (2008) 52:229-255.

* cited by examiner

SYSTEMS, METHODS AND COMPUTER PROGRAM PRODUCTS FOR COLLABORATIVE AGENT CONTROL

CROSS-REFERENCE TO RELATED APPLICATIONS

This application is a continuation-in-part (CIP) patent application claiming priority to U.S. patent application Ser. No. 14/258,986, entitled "SYSTEM AND METHOD FOR OPERATOR CONTROL OF HETEROGENOUS UNMANNED SYSTEM TEAMS, filed on Apr. 22, 2014, by Buerger et all, which claims priority to U.S. Provisional Patent Application Ser. No. 61/814,717, entitled "A SYSTEM AND METHOD FOR OPERATOR CONTROL OF HETEROGENOUS UNMANNED SYSTEM TEAMS, filed on Apr. 22, 2013, by Buerger et al., and this application also claims priority to U.S. Provisional Patent Application Ser. No. 62/301,943, "SYSTEMS, METHODS AND COMPUTER PROGRAM PRODUCTS FOR COLLABORATIVE AGENT CONTROL," filed Mar. 1, 2016, by Buerger et al., the disclosures of which are incorporated herein by reference in their entireties.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to collaborative networking, and more particularly to systems, methods and computer program products that combine information available from multiple agents in different locations to improve overall situational awareness, localization accuracy and bandwidth efficiency.

BACKGROUND

Networks of wirelessly connected mobile systems (e.g. unmanned vehicles, remote sensors, personnel trackers, etc.) are emerging as a key technology for national security and commercial applications.

Sandia Corporation recently filed U.S. patent application Ser. No. 14/258,986, entitled "A SYSTEM AND METHOD FOR OPERATOR CONTROL OF HETEROGENOUS UNMANNED SYSTEM TEAMS, filed on Apr. 22, 2014, which may be referred to as "One Controlling Many" (OCM) technology, which discloses capabilities enabling a single operator to control a collaborating heterogeneous team of unmanned systems in the execution of dynamic, tactical operations. While OCM provides a critical and differentiating control capability, its initial implementations assumed the presence of a) uninterrupted, high bandwidth wireless communications, and b) high-quality real-time localization data (e.g. high quality GPS) and required these to work properly. These assumptions are not unique to the OCM approach; essentially all common approaches for multi-agent collaboration depend on quality communications and localization to work properly. In reality, in many operating environments teams of unmanned systems face degraded communications, requiring them to compete for limited and inconsistent bandwidth, as well as degraded, intermittent or suppressed GPS, requiring them to self-localize.

The need remains, therefore, for systems, methods and computer program products that use the benefits of multi-agent collaboration to compensate for limited communications and localization.

SUMMARY OF THE DISCLOSURE

The present invention is directed to systems, methods and computer program products that use the benefits of multi-agent collaboration to compensate for limited communications and localization. These systems, methods and computer program products can be referred to as TEAM Estimation (TE) systems, methods and computer program products. In general, TE requires each agent in a collaborating network to continuously simulate numeric models of all of the other agents in the network, and uses these simulations to a) dramatically reduce the computational bandwidth required between agents, and b) improve the quality of shared estimates of the agent locations as well as the locations and characteristics of other objects of interest, e.g. targets. The bandwidth is reduced by using the models to intelligently filter data before communicating it, sharing only data that significantly changes the state of the models running on the receiving agent. Localization is improved by sharing data derived from measurements taken from different perspectives—and again, only sharing data that significantly shifts the models.

According to an embodiment of the disclosure, a method for controlling multiple unmanned, autonomous agents is disclosed that includes executing in two or more agents of the multiple unmanned, autonomous agents a dynamic model that outputs one or more mission parameters selected from a group including reducing the communication bandwidth needed to maintain a selected quality of shared estimate of system state, improving quality of state estimates through collaborative data fusion, enabling collaborative target identification and localization between the two or more agents, and enabling automated generation of sub-tasks or execution of collaborative tasks According to another embodiment of the disclosure, an unmanned, autonomous vehicle is disclosed that includes a processor for executing instructions that outputs one or more mission parameters to one or more other unmanned, autonomous vehicles, the outputs selected from a group including reducing the communication bandwidth needed to maintain a selected quality of shared estimate of system state, improving quality of state estimates through collaborative data fusion, enabling collaborative target identification and localization between the two or more agents, and enabling automated generation of sub-tasks or execution of collaborative tasks According to another embodiment of the disclosure, a system is disclosed that includes an operator command and control station, a communications network linked to the operator command and control station, and two or more unmanned, autonomous vehicles that receive mission instructions from the operator command and control station via the communications network. The two or more unmanned, autonomous vehicles comprise a processor for executing instructions that outputs one or more mission parameters to one or more other unmanned, autonomous vehicles, the outputs selected from a group consisting of reducing the communication bandwidth needed to maintain a selected quality of shared estimate of system state, improving quality of state estimates through collaborative data fusion, enabling collaborative target identification and localization between the two or more agents, and enabling automated generation of sub-tasks or execution of collaborative tasks One advantage of this disclosure is that its methodology provides for systems, methods and computer program products that use the benefits of multi-agent collaboration to compensate for limited communications and localization Another advantages of the present disclosure are to:
1. Enable the execution of advanced collaborative behaviors that require knowledge of agent state, without GPS or other infrastructure for localization.
2. Enable the execution of advanced collaborative behaviors with minimal communications bandwidth.
3. Enable improved localization of actors and objects in a common operating space by fusing data from sensors from different vehicles with different perspectives.
4. Enable the presentation of a detailed common operating picture, including the location of agents and other objects in the operating space, to a human operator using minimal communications bandwidth.
5. Enable the autonomous execution of advanced collaborative missions without intervention by a human operator(s).

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1:
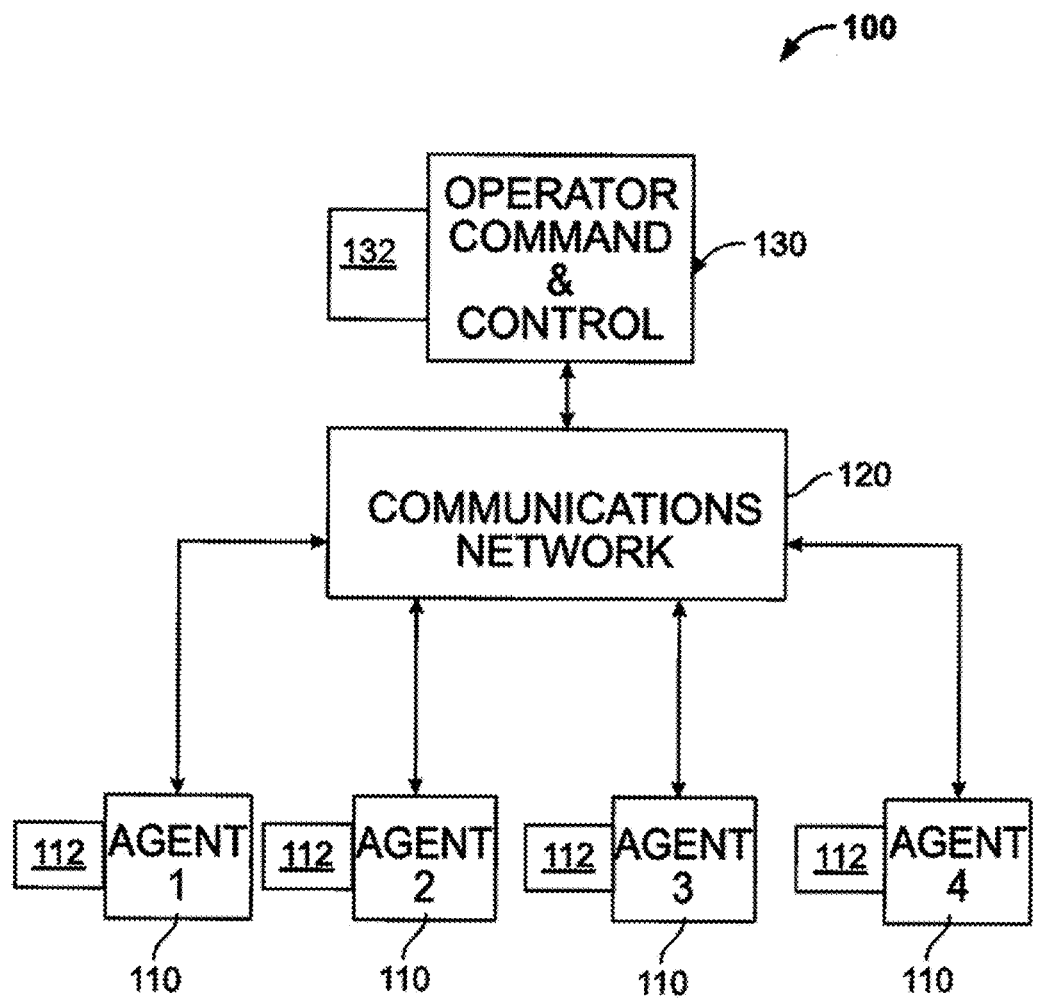
FIG. 1 illustrates a system for heterogeneous UMS control according to an embodiment of the disclosure.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present invention is directed to systems, methods and computer program products that use the benefits of multi-agent collaboration of unmanned systems (UMS) to compensate for limited communications and localization. These systems, methods and computer program products can be referred to as TEAM Estimation (TE) systems, methods and computer program products. In general, TE requires each agent in a collaborating network to continuously simulate numeric models of all of the other agents in the network, and uses these simulations to a) dramatically reduce the computational bandwidth required between agents, and b) improve the quality of shared estimates of the agent locations as well as the locations and characteristics of other objects of interest, e.g. targets. The bandwidth is reduced by using the models to intelligently filter data before communicating it, sharing only data that significantly changes the state of the models running on the receiving agent. Localization is improved by sharing data derived from measurements taken from different perspectives—and again, only sharing data that significantly shifts the models.

TE enables a common world model and decision making framework compatible with limited and variable communication bandwidth, uses collaboration to improve localization in denied environments, provides a framework for the fusion of data from multiple sources to improve target discrimination and tracking, and enables the collaborative execution of complex objectives with minimal communications to the operator.

The team estimation capability is motivated by three principles:
  The ability to share the right information at the right time is critical for collaborative systems of heterogeneous agents, regardless of the specific collaboration algorithms.
  Collaborative behaviors must function with extremely limited communications, but also need to take advantage of better communications when available to improve performance.
  The availability of onboard computation will increase as systems are updated, whereas high-bandwidth communication will be increasingly limited in congested or otherwise challenging environments.

The present disclosure uses a methodology supported by dynamic models of all relevant actors (blue force, red force, noncombatant and unknown) in an operational space. Models run continuously and locally onboard each agent (blue force), and at the control station, developing shared estimates of actor characteristics and behaviors based on information available at different agents and shared through limited distributed communications. These estimates are intelligently computed, maintained, and used for collaborative task performance and control while communication is minimized. Estimates improve near-optimally when communication bandwidth increases by prioritizing the use of the available bandwidth for the most impactful and valuable information, resulting in improved performance of the collaborating system. Advanced filtering algorithms consisting of a series of dynamic models and estimators are used to adaptively determine the most important information to share. Each agent maintains a series of virtual stand-ins representing other actors in the system, not only modeling their dynamics and capabilities (e.g. payload packages), but also their control systems.

This approach, improves performance in four different ways: by reducing the communication bandwidth needed to maintain a particular quality of shared estimate of system state, by improving the quality of state estimates through collaborative data fusion (particularly in the absence of GPS or other low-uncertainty localization sensors), by enabling collaborative target identification and localization, and by enabling automated generation of sub-tasks and improved execution of high-level collaborative tasks. Other low-uncertainty localization sensors, may be, but are not limited to local radio-frequency based geo-location systems, high-accuracy terrain-based localization, optical motion-capture systems, and high-accuracy inertial sensors.

In an embodiment, TE is integrated into "One Controlling Many (OCM)" capability disclosed in co-owned U.S. patent application Ser. No. 14/258,986, entitled "SYSTEM AND METHOD FOR OPERATOR CONTROL OF HETEROGENOUS UNMANNED SYSTEM TEAMS, filed on Apr. 22, 2014, by Buerger et al., published as US2015/0035843-A1 on Feb. 5, 2015 of the same title, incorporated herein by reference in its entirety. TE provides OCM a common world model and decision making framework compatible with limited and variable communication bandwidth, using collaboration to improve localization in denied environments, providing a framework for the fusion of data from multiple sources to improve target discrimination and tracking, and enabling the collaborative execution of complex objectives with minimal communications to the operator.

According to an embodiment, TE includes:
1. Model-based bandwidth efficient communications protocol (MoBBE), which combines communications with model-based predictions to reduce the bandwidth consumed moving state information and improve the robustness of networks of collaborating UMS to communication failures.
2. Collaborative state estimation (CSE) provides a framework to fuse data from multiple agents in a model-based estimation environment, simulated commonly across multiple UMS agents, to dramatically improve localization estimates versus typical single-agent dead-reckoning approaches.
3. Collaborative target identification and localization (CTIL) applies similar methods to the estimation of the location and characteristics of objects that are not part of the collaborating network.
4. Automated task generation works with the OCM engine (and SAHUC architecture) to enable collaborating UMS teams to automatically generate sub-tasks, subordinate to higher-level objectives assigned by the operator, without human intervention.

FIG. 1 illustrates an embodiment of a system for heterogeneous UMS control 100. The system may be referred to as an Architecture for Heterogeneous UMS Control (AHUC) system. The AHUC system 100 includes agents 110, a communications network 120, an Operator Command and Control (OCC) station 130 and an operating system or operating architecture (not shown) embedded within the system. In this exemplary embodiment, the AHUC system 100 is shown with four agents, however, in another embodiment; the AHUC system 100 may include one or more agents 110. Control includes a mix of centralized and distributed elements according to an embodiment of the disclosure. Communication can be fully centralized or partially distributed. An operator interacts with the command & control agent to influence system behavior.

The agents 110 are platforms that include one or more packages. The packages may include sensors, communications relay antennae, actuators or other payloads. The agents 110 may be mobile, fixed or any combination thereof. The agents 110 may be any one or combination of ground, land, air, and water operational agents. The agents 110 include one or more sensors that detect and respond to some type of input from the physical environment. The sensors may be, but are not limited to visual and/or infrared (IR) cameras, chemical and/or biological detectors, radiation detectors, three dimensional imaging systems, seismic sensors, acoustic sensors, radars, range finders, temperature or pressure sensors. In an embodiment, ground agents may be wheeled or tracked ground vehicles having one or more sensors. In an embodiment, aerial agents may be balloon, rotor or fixed wing aircraft having one or more sensors. In an embodiment, fixed position agents may be fixed platforms having one or more sensors, such as, but not limited to cameras and biologic and chemical sensors.

The agents 110 include a distributed intelligence module 112. The distributed intelligence module 112 includes hardware and software capable of receiving and processing commands from the OCC station 130 and from other agents, and is also capable of transmitting commands, sensor output and other messages to the OCC station 130 and other agents. The commands may include commands to move the agent from one position to another position(s) and tasks to be performed at position(s). The movement command(s) may include waypoints, spatial curves to move along, spatial areas through which to move, and spatial volumes through which to move. The task command(s) may include but are not limited to gathering sensor data, manipulating or grasping objects, switching to alternative power states, positioning communications antennae to act as relays, and delivering payloads.

The distributed intelligence module 112 may include a communications module, an operator interface, processor, storage, actuators and agent interface(s) and to control agent operations, such as, but not limited to movement, sensor operations, communications operations, manipulation, and payload delivery. The communications module is capable of receiving and transmitting communications to and from the communications network 120. In an embodiment, the communications module may include a receiver module and a sender module. In an embodiment, the receiver and sender modules may be radio frequency (RF) modules.

The communications network 120 includes communication links capable of transmitting data between the OCC station 130 and agents 110 and between agents without the OCC station. The communication links may include wireless and wired systems, such as, but not limited to fiber optic, radio frequency (RF), free space optical and electrically wired systems.

The data communicated between the OCC station 130 and the agents 110 may include high level task and objective information, agent state information, lists of agents and presently assigned tasking, numeric weights describing the relative importance of different system performance criteria, direct real-time actuator commands, waypoints, environment and obstacle map information, sensor data, lists and descriptions of targets, performance metrics, and threat information.

The data communicated between the agents 110 may include high level task and objective information, agent state information, lists of agents and presently assigned tasking, numeric weights describing the relative importance of different system performance criteria, waypoints, environment and obstacle map information, sensor data, lists and descriptions of targets, performance metrics, and threat information.

The OCC station 130 includes a user interface and hardware and software capable of defining and updating mission objectives and correcting agent autonomy errors. Mission objectives may include but are not limited to searching specific physical spaces, approaching particular physical locations, patrolling particular spatial curves or areas, following targets, tracking targets, escorting targets, surrounding targets, manipulating or moving objects, establishing and maintaining high-bandwidth communications relays, and deploying payloads in particular locations or near particular targets. Targets may be stationary or moving. Agent autonomy errors may include but are not limited to failure to identify obstacles or terrain problems, misinterpretation of sensor data, failure to select the simplest solution, limit cycle behavior, losing track of targets, and failure to localize properly in a global map.

The OCC station 130 includes a centralized intelligence module 132. The centralized intelligence module 132 includes hardware and software capable of processing, storing, receiving and transmitting information. The centralized intelligence module may communicate with the agents, interface with at least one human operator, make high-level assignments of agents to tasks, execute mid-level behaviors, and execute low level behaviors. The centralized intelligence module 132 may include a human-machine interface, high level assignment and control algorithms, communications hardware and software, mid-level estimation and control algorithms, and low level control algorithms.

As discussed above, the AHUC system 100 includes an operating system or operating architecture (not shown) embedded within the system. The operating architecture may be referred to as AHUC. The AHUC includes a communications architecture, a data model and a control architecture.

The operating architecture is embedded in a non-transitory machine-readable medium in communication with at least one processor, the non-transitory machine-readable medium storing instructions which, when executed by the at least one processor of a machine, causes the machine to perform operations including agent movement and sensor operation. The processor may include one or more central processing units (CPUs) and may be physically installed in computing platforms such as but not limited to netbooks, personal computers PCs), embedded computers with the PC/104 form factor and bus, or industrial computers using the CompactPCI Express bus, and using instruction set architectures including but not limited to x86, x86-64, Alf and Vegard's RISC (AVR), or Acorn RISC Machine (ARM), where RISC is for Reduced Instruction Set Computing. The non-transitory machine-readable mediums may include one or more such as, but not limited to RAM, ROM, hard drives, and solid state memory.

The communications architecture includes a means of sending information between processes within a single platform and between platforms connected wirelessly or wired together. The communications architecture may include one or more communications buses. The communications architecture may include one or more radios including but not limited to Ethernet radios, Zigbee radios, or military radios.

In an embodiment, the communication architecture may use multi-platform coordination over a lossy wireless network incorporating User Datagram Protocol (UDP) broadcast for inter-platform communications. This allows messages to be dropped and for multiple receivers to listen to the same transmission, both reducing wireless network congestion. In this configuration, different topics may be broadcast on different pre-specified ports. Anyone interested in topic X could listen on port X. Google Protocol Buffers middleware was chosen as a simple way to serialize/deserialize the messages being sent. The data model was defined in the Google Protocol Buffer space and was then translated to/from Robot Operating System (ROS) messages by a client process running on each platform. In another embodiment, a ZeroMQ publish/subscribe multicast connection may be used to serialize/deserialize and send messages over the publish/subscribe network. In a third embodiment, Data Distribution Service for Real-Time Systems (DDS) may be used to serialize/deserialize and send messages over the publish/subscribe network. The communication architecture may be implemented in many different protocols or middlewares, though it is critical that individual agents be able to access a customized subset of the system messages, that data be economized, that communication latencies are minimized, and that the protocol be tolerant to disruptions.

The control architecture includes/provides an organized collection of control segments that each execute predetermined functions that together provide control over a collection of agents. The control segments may be control algorithms implemented in software or in electrical circuitry. The control architecture defines a set of inputs and a set of outputs for each control segment and provides a framework in which information flows between the control segments.

The TE architecture includes a model-based bandwidth efficient (MoBBE) communications protocol module, a collaborative state estimation (CSE) module, a collaborative target identification and localization (CTIL) module, and an automated task generation and improved execution module.

MoBBE is a means of intelligently using mathematical models shared by senders and receivers to move messages with bandwidth-dependent allowable estimate errors/uncertainty, enabling data quality to be traded against available bandwidth, particularly when bandwidth is highly variable due to denial. MoBBE exchanges reduced bandwidth for increased distributed computation (due to model-based predictions). Sender/receiver pairs with matched dynamic models and estimators are established for each connection between operating UMSs in the system. MoBBE's performance is expected to provide a reduction of 80-90% in communications bandwidth with less than a 20% increase in state estimate error for relevant missions. A preliminary implementation of MoBBE supports these estimates. This capability explicitly manages the communications challenges of denied environments, supports the development of a common world model, and improves mission efficiency by ensuring that communications bandwidth is used near-optimally, and by minimizing error in the shared operating picture.

The shared sender/receiver model allows a sender to intentionally "drop" messages when it predicts the receiver can maintain the allowable uncertainty through its own model-based predictions. A constant data rate is maintained at the MoBBE receiver output by replacing dropped messages with synthetic data from the local model. By not transmitting unnecessary messages the bandwidth can be greatly reduced. MoBBE exchanges reduced bandwidth for increased computation (due to model-based predictions). It enables an adaptable tradeoff between allowable uncertainty and bandwidth for all information related to modeled actors (blue force, red force, unknowns, others) and behaviors.

Collaborative state estimation (CSE) is model-based estimation and data fusion from multiple sources method that dramatically improved estimates of team state in environments that lack GPS. Fusing data from multiple agents on different paths can reduce the uncorrelated errors in location estimation. As the number of agents sharing data increases, the quality of shared location estimates improves, provided that sources of error are independent. CSE is facilitated by each agent continuously running a local dynamic model of all other agents in the team. It is estimated that CSE can reduce the RMS errors in blue force location estimation by 50-80% for communicating networks of at least four agents; preliminary simulations support this prediction. CSE provides a common operating picture, and enables dramatic improvements in mission efficiency resulting from improved localization.

Estimates of UMS locations that depend on inertial sensors in the absence of steady GPS are susceptible to accumulated/integrated errors. Data from other agents (e.g. estimates of other agents' positions based on onboard sensors, range data from radios or other direct sensors, data from map-based fiducials, etc.) are used to improve these estimates. Fusing data from multiple agents on different paths reduces the uncorrelated errors in location estimation. As the number of agents sharing data increases, the quality of shared location estimates improves, provided that sources of error are independent. CSE is facilitated by each agent continuously running a local dynamic model of all other agents in the team, including models of possible movements as well as likely control actions. Incorporating CSE into OCM capability for collaborative task assignment and execution, each agent can maintain predictions of the other agents' behaviors, providing additional information to improve state estimate quality. The model-based collaborative estimation capability may be combined with MoBBE to determine when to send data concerning an agent's estimates of its own location and that of other agents Collaborative target identification and localization (CTIL) is a framework within which multi-modal sensor data (e.g. acoustic, optical, RF) from multiple agents with different perspectives may be intelligently fused to improve statistical certainty in identifying and locating objects that are not part of the collaborating team, generally referred to as "targets." The individual measurements can be fused together to form more accurate and precise target estimates based upon known models of potential targets' dynamics and signatures, including probabilistic estimates of target identity (e.g. a 30% chance a target is type #1 and a 70% chance it is type #2). By sharing target location estimates and fusing those using dynamic models, we expect to reduce RMS target state estimation errors by 25-50% when a minimum of four agents participate in localization, for stationary and moving targets, and to reduce the time from detection to 90% confident classification by 25-50%.

Just as sharing data and dynamic models may improve estimation of the states of members of the collaborating team, collaboration may also be used to improve the identification, discrimination and tracking of other objects, generally referred to as "targets." TE provides a framework within which multi-modal sensor data (e.g. acoustic, optical, RF) from multiple agents in different locations will be intelligently fused with templates of known target types (signatures, vehicle dynamics, etc.) to improve statistical confidence of target identification and location. CTIL implements mechanisms for the spontaneous creation (and elimination) of new potential actors in the shared system model in response to sensor data, and defines criteria by which information is exchanged with a system operator, e.g. to present an image of a target for confirmation. By extending MoBBE to share information about potential targets, only data that significantly alters the target models is shared, limiting bandwidth consumed.

Automated task generation and improved execution is structured by combining MoBBE, CSE, CTIL with an OCM framework for the assignment and execution of tasks by teams, so as to enable the automatic creation of tasks by agents in the team without operator intervention. In order to execute dynamic, tactical operations against active adversaries, agents in OCM are assigned to objectives automatically, and assignments are continually re-calculated and changed as needed, without operator intervention, to adapt to events. Building on OCM, this structure enables agents to generate new tasks that fulfill higher-order objectives based on estimates produced by the common models used for MoBBE, CSE and CTIL, and make assignments to execute these tasks. Performance improvements are measured by the number of actions required from a simulated operator, with and without the new capabilities. It is estimated that operator actions can be reduced by 50-80%. This enables one or fewer operator to control the system, while also contributing to mission efficiency improvements by limiting delays associated with operator actions.

Ultimately, the benefits of TE are expressed by an improved ability to complete mission objectives. The TE capabilities can be integrated with an adaptation of the OCM framework for the assignment and execution of tasks by teams. The combination of these capabilities enables the automatic creation of tasks by agents in the team without operator intervention. For example, a task to view a possible target with a particular sensor modality may be generated automatically if the shared model predicts that this will improve the target identification statistics. This capability significantly alleviates the need for the operator to interact with the system at a low level, allowing the operator to focus on higher level tactics and decision-making.

When the four elements of TE (MoBBE, CSE, CTIL and Automated task execution) are all integrated, the following results are estimated: a greater than 80% reduction in total communications bandwidth, a greater than 50% reduction in agent state estimate error, a greater than 25% reduction in target state estimate error, a greater than 25% reduction in time from detection to 90% confident classification, and a greater than 50% reduction in operator actions to execute full missions versus baseline scenarios without these advanced control capabilities.

Figure 2:
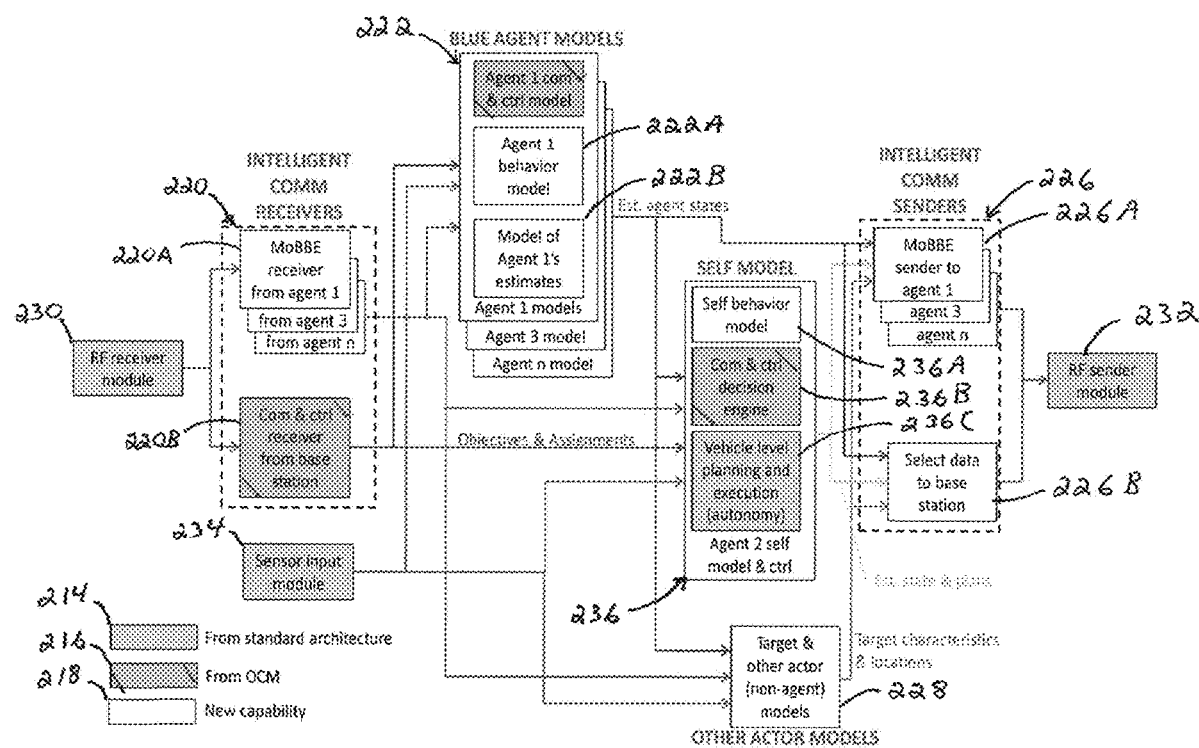
FIG. 2 shows a simplified diagram of team estimation components for Agent #2 according to an embodiment of the disclosure.

FIG. 2 illustrates a distributed intelligence module 112 according to an embodiment of the disclosure. FIG. 2 illustrates a distributed intelligence module 112 in the context of Agent #2, who is part of a multi-agent system according to an embodiment of the disclosure. The distributed intelligence module 112 includes standard architecture module components 214 (shown as gray boxes), OCM architecture components 216 (shown as gray boxes with hashed corners) and TE architecture components 218 (shown as open boxes), which are organized within several distributed intelligence sub-modules including intelligent communications (comm) receivers module 220, friendly or blue agent models module 222, a self-model module 224, an intelligent comm senders module 226, and other actor models module 228. The standard and OCM architectures are discussed in co-owned U.S. patent application Ser. No. 14/258,986, entitled "SYSTEM AND METHOD FOR OPERATOR CONTROL OF HETEROGENOUS UNMANNED SYSTEM TEAMS, filed on Apr. 22, 2014, by Buerger et al., published as US2015/0035843-A1 on Feb. 5, 2015 of the same title, incorporated herein by reference in its entirety.

The standard architecture components 214 includes an RF receiver module 230, an RF sender module 232, a sensor input module 234 and a vehicle level planning and execution module 236. The RF receiver and sender modules 230, 232 receive and send communications from an agent to the communications network 120 (FIG. 1). In this exemplary embodiment, the RF receiver and sender modules 230, 232 are shown as two modules, however, in other embodiments, the RF receiver and sender module functions may be provided by one or more modules, and include hardware and software for performing receive and send RF communications.

The sensor input module 234 includes one or more sensors as described above for detecting and responding to some type of input from the physical environment, and sharing that sensor data with the agent architecture. Sensor data quantifies observed characteristics of the agents and physical environment including but not limited to localization measurements, environment characteristics, and potential target characteristics. The output of the sensor input module 234, formatted and organized sensor data, is provided to the blue agent models module 222, the self-model module 224 and the other actor models module.

The intelligent comm receivers module 220 receives communicated data from the RF receiver module and merges it with data generated by Agent 2's blue agent models, self-model, and other actor models to produce a composite data stream. The intelligent communication (comm) receivers module 220 includes MoBBE receiver for other agent x sub-module 220A and command (com) and control receiver from base station sub-module 220B. The MoBBE receiver for other agent x sub-module 220A and the com and control receiver from base station sub-module 220B receive communicated data from the RF receiver module 230.

The MoBBE receiver for other agent x sub-module intelligently filters the incoming data related to the state and behavior of other agent x as well as for any other agents for which other agent x has updated data, and augments this data with data from agent 2's model of agent x and any other agents for which data is provided. The output of the blue agent models module 222 loops back into the intelligent comm receivers module 220, but this is not shown on FIG. 2 for clarity. The MoBBE receiver for other agent x sub-module outputs a composite data stream describing the state and behavior of and sensor measurements from other agent x. The com and control receiver from base station sub-module 220B intelligently filters the incoming data from the base station and updates the commands, objectives and assignments for all agents. The com and control receiver from base station sub-module 220B outputs commands, objectives and assignments for agent 2 as well as for all of the other blue agents, which direct their high-level behavior. For example, outputs and objectives may include, but are not limited to assigning one or more agents to explore a region of the environment and search for targets, assigning one or more agents to self-arrange in order to create a mesh wireless network, assigning one or more agents to follow or escort a manned vehicle or another actor, or assigning one or more agents to patrol a perimeter.

The blue agent models module 222 runs computational models of all of the friendly agents other than agent 2 to predict their behavior. The blue agent models module 222 includes an other agent x com and control model sub-module 222A, an other agent x behavior model sub-module 222B and a model of other agent x's estimates sub-module 222C. The other agent x com and control model sub-module 222A runs a computational model of the objectives, assignments and control inputs that directs agent x's high level behavior. The other agent x com and control model sub-module 222A includes part of the CSE architecture. The other agent x behavior model sub-module 222B runs a computational model of agent x's state and behavior, and estimates and predicts agent x's state and actions. Together, all of agent 1-$n$'s other agent x behavior model sub-modules 222B form a distributed estimator of agent x's state and actions. The model of other agent x's estimates sub-module 222C runs computational models that approximate all of the other agent behavior model sub-modules 222B (for agents 1-$n$) that run on agent x, based on information estimated to be available to agent x, so that agent 2 can accurately estimate what the models running on agent x will predict. Agent 2 also runs a computational model of the estimates available to the command and control base station, not shown in FIG. 2 for clarity, so that agent 2 can accurately predict what information is presented to the human operator.

The blue agent models module 222 receives a composite data stream describing the state and behavior of and sensor measurements from other agent x from the MoBBE receiver from other agent x sub-module 220A and objectives and assignments from the com and control receiver from base station sub-module 220B. Together, the other agent x com and control model sub-module 222A, the other agent x behavior model sub-module 222B and the model of other agent x's estimates sub-module 222C provide an estimated agent states output. The estimated agent states output is agent 2's current estimate of the state and actions of agent x, based on measurements, data received from other agents, and agent 2's model of agent x.

The self-model module 224, which may be referred to as agent 2 self-model and control module, runs a computational model of agent 2's own state and actions, computes desired behaviors based on high-level control commands, objectives and assignments, and executes these desired behaviors with low-level actions, including autonomously controlling movement from the current state to desired future states. The self-model module 224 includes a self-behavior sub-model 224A, a com and control decision engine sub-module 224B, and a vehicle level planning and execution sub-module 224C. The self-behavior sub-model 224A runs a computational model of agent 2's own state and actions, estimating its current state as accurately as possible based on all information sources. The self-behavior sub-model 224A includes part of the CSE architecture. The com and control decision engine sub-module 224B computes desired behaviors for agent 2 based on high-level control commands, objectives and assignments. The com and control decision engine sub-module 224B includes the automated task execution architecture. The vehicle level planning and execution sub-module 224C executes the desired behaviors for agent 2 with low-level actions, including autonomously controlling movement from the current state to desired future states.

The self-model module 224 receives estimated agent states from the blue agent models module 222, a composite data stream describing the state and behavior of and sensor measurements from other agent x from the MoBBE receiver from other agent x sub-module 220A, objectives and assignments from the com and control receiver from base station sub-module 220B, and sensor data from the sensor input module 234. The self-model module 224 then outputs an estimated state and plans, which includes agent 2's current estimate of its own state, as well as its own updated control inputs and high-level behavior plans.

The target and other actor (non-agent) models module 228 runs computational models of targets and other actors in the environment that are not blue force agents. The target and other actor models module 228 receives estimated agent states from the blue agent models module 222, a composite data stream describing the sensor measurements from other agent x from the MoBBE receiver from other agent x and sensor data from the sensor input module 234, and calculates and outputs target characteristics and locations. The target characteristics and locations output may be, for example a list of targets with their estimated locations and quantitative description of their characteristics for example including but not limited to physical dimensions, materials, target type, or operational state. The target and other actor models module 228 thus includes the CTIL architecture.

The intelligent comm senders module 226 determines the highest-priority data to send to the other agents based on the available instantaneous communications bandwidth and the output of all of the models. The intelligent comm senders module 226 includes a MoBBE sender to other agent x sub-module 226A and a select data to base station sub-module 226B. The MoBBE sender to other agent x sub-module 226A compares the updated estimates of agent states, estimated state and plans, and target characteristics and locations to the approximate estimates of agent x's models for each of these things, and determines the most important data to send based on the deviation from the model and the importance of the data. Algorithms optimize which data to send at each time step, prioritizing estimates that deviate the most from other agent x's models as well as data that is categorized as having highest importance. The select data to base station sub-module 226B similarly transmits the updated estimates of agent states, estimated state and plans, and target characteristics and locations that deviate most significantly from the existing base station data/estimates and which are categorized as having the highest importance, to the base station.

The intelligent comm senders module 226 receives estimated agent states from the blue agent models module 222, estimated state and plans from the self-model module 224, and target characteristics and locations from the target and other actor models module 228, and outputs prioritized estimate data to the RF sender module to be transmitted to the other agents and the base station. The output may be, but is not limited to estimates of agent state, control inputs, behavior plans, target characteristics or target locations.

As can be seen in this exemplary embodiment, the distributed intelligence module includes an intelligent model-based bandwidth efficient (MoBBE) communications layer; a set of dynamic models for blue agents, other actors, and extended "self-modeling" that incorporates relevant information from other agents (e.g. location estimates); and advanced collaborative task assignment and execution. Via application of OCM, agents can automatically and collaboratively make assignments to a list of user-generated objectives, and continuously adapt on the fly to changing circumstances. One major contribution of TE is to create model-based virtual stand-ins for remote elements of a multi-UMS team to intelligently fuse data and generate realistic synthetic data when measured or reported data is unavailable, providing the critical ability to robustly maintain operations in environments where communications and other signals may be intermittent, and to optimize limited bandwidth to maximally improve performance. These stand-ins will benefit Collaborative UMS operations in the following four ways.

Figure 3A:
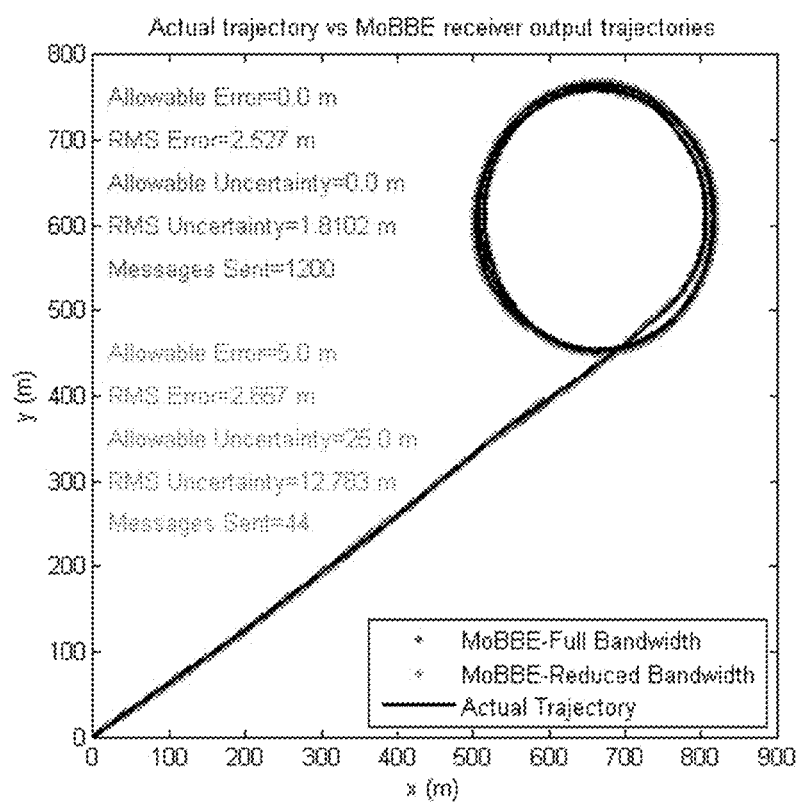
FIG. 3A shows actual trajectory, received trajectory using full bandwidth, and received trajectory with bandwidth reduced by 96.3% for results of simplified MoBBE simulation according to an embodiment of the disclosure.
Figure 3B:
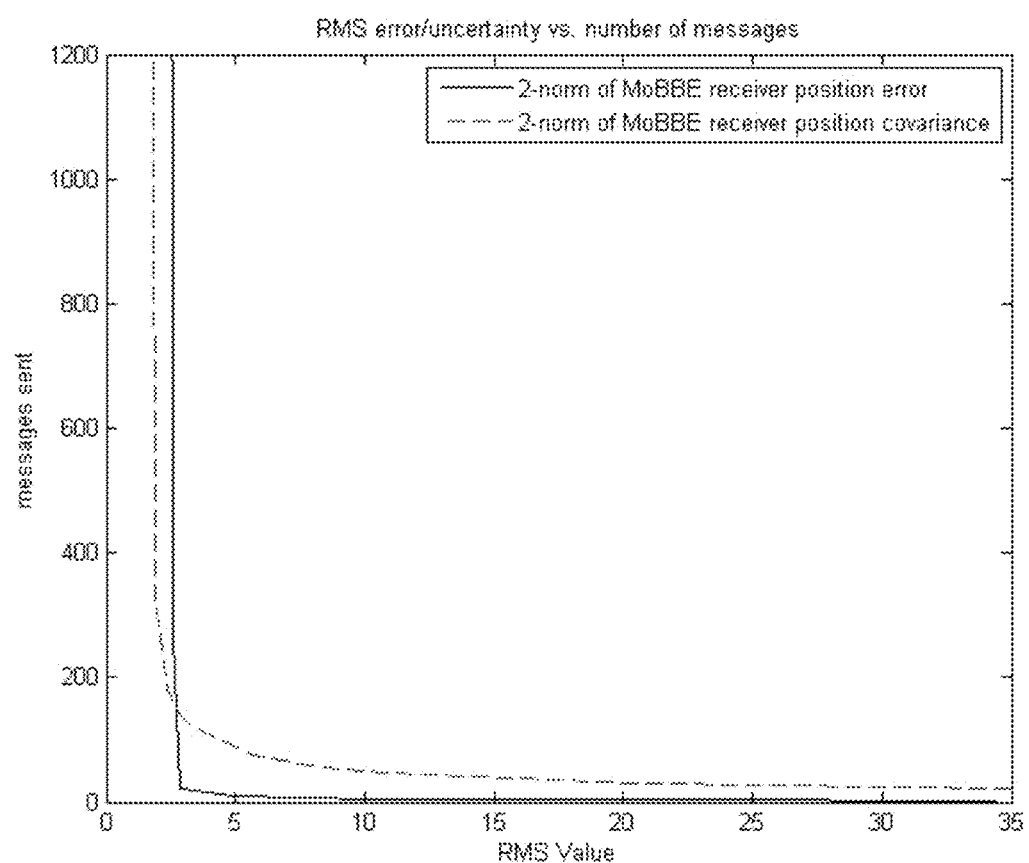
FIG. 3B shows messages required vs error and uncertainty thresholds for results of simplified MoBBE simulation according to an embodiment of the disclosure.

The MoBBE communications protocol dramatically reduces the bandwidth required to communicate information such as actor state, without significantly impacting the quality of state estimates. The results of a simple MoBBE simulation are shown in FIGS. 3A and 3B. FIG. 3A shows actual trajectory, received trajectory using full bandwidth, and received trajectory with bandwidth reduced by 96.3%. FIG. 3B shows messages required vs error and uncertainty thresholds. In this case, the goal is to estimate the trajectory of a single UAV in real-time at a remote location. A MoBBE sender (on the UAV) and MoBBE receiver (at the remote location such as another UAV or base station) each run identical models of the UAV, in this case applying an extended Kalman filter (EKF). Estimate performance may be traded against bandwidth by tuning the allowable error of estimate and allowable uncertainty of estimate.

In the first simulation (estimate shown in red in the left panel), the allowable error and uncertainty were set to zero, forcing the sender to output data at the maximum rate available, resulting in 1200 messages sent in the simulated time period. This is equivalent to a typical fixed-data rate implementation. In a second simulation (estimate in green), the error and uncertainty parameters were adjusted. The result was that only 44 messages were sent in the same time period, a reduction in bandwidth of 96.3%. The RMS error of the position estimate, which results from a combination of measurement error and error introduced by MoBBE, increased by just 13%. The right panel shows the number of messages required to maintain various position error and uncertainty thresholds. Dramatic bandwidth savings may be achieved at modest error and uncertainty thresholds. Intriguingly, there appear to be diminishing returns to further increasing the thresholds, suggesting that there may be an application-specific optimal tradeoff between estimate quality and communications bandwidth. Based on preliminary implementations, we conservatively anticipate that MoBBE reduce communications bandwidth by 80-90% with less than a 20% MoBBE-induced increase in state estimate error (when combined with CSE this error is reduced, not increased, relative to baseline) for realistic missions.

Figure 4A:
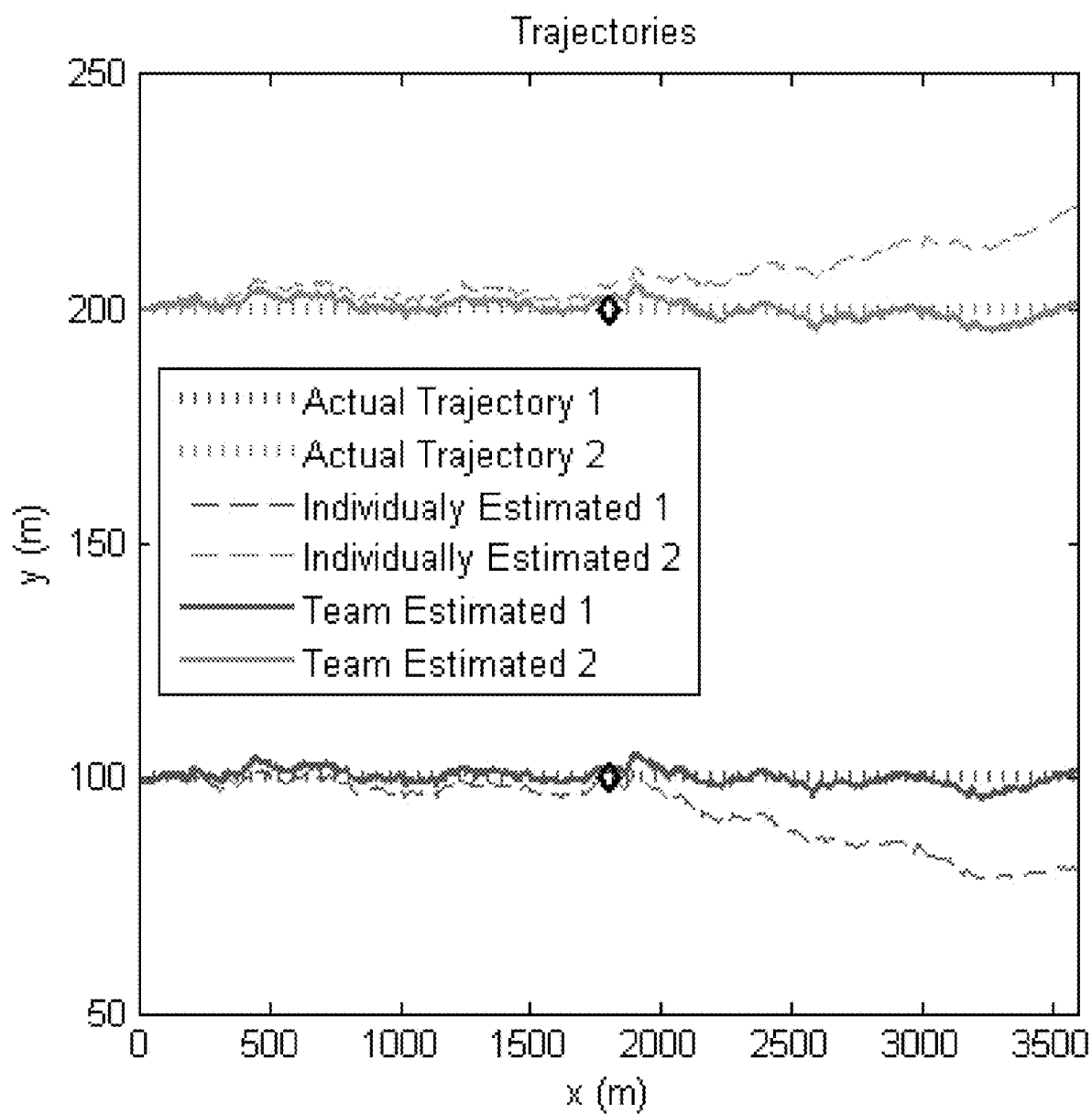
FIG. 4A shows actual and estimated trajectories for results from pilot CSE simulation according to an embodiment of the disclosure.
Figure 4B:
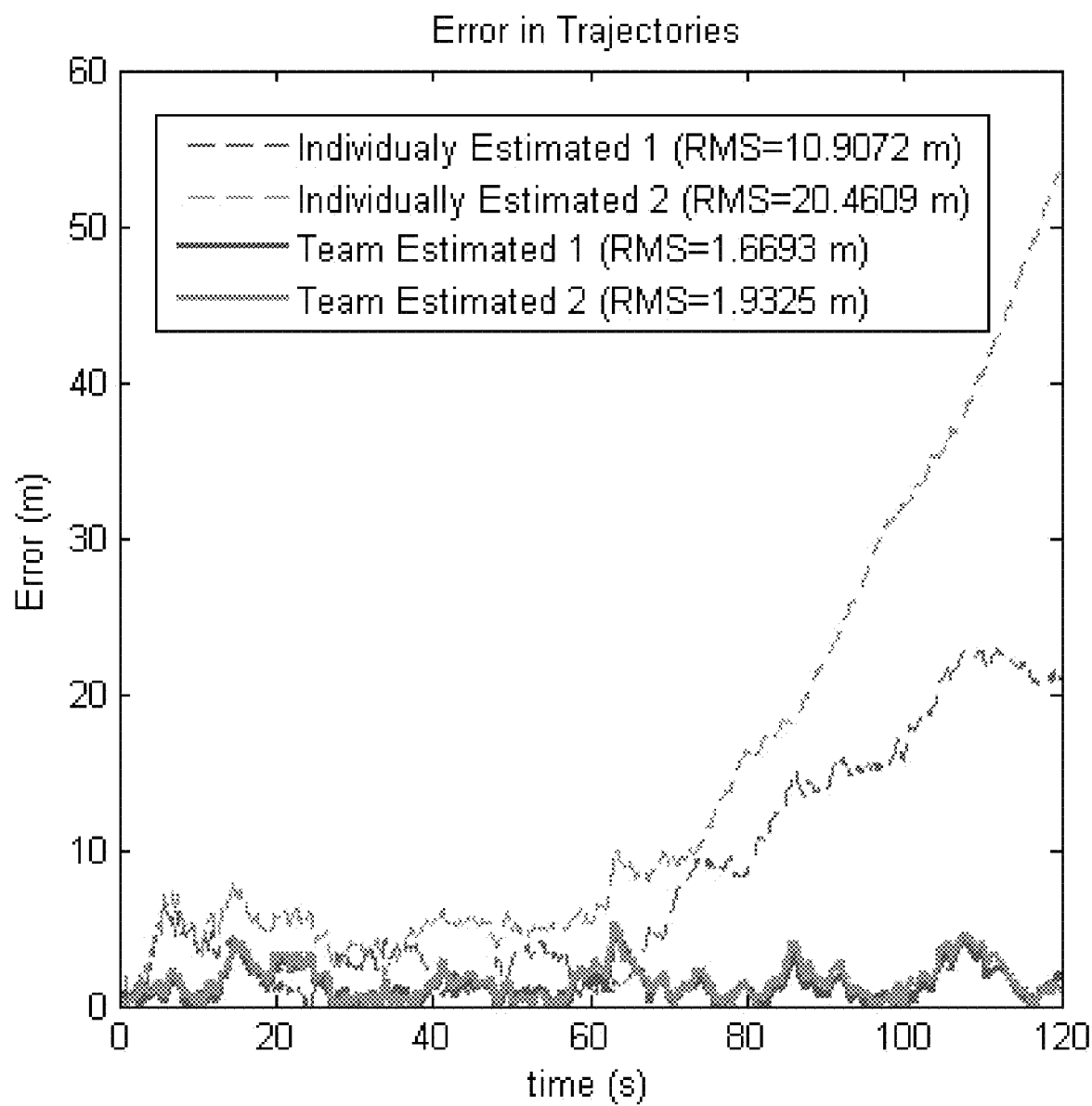
FIG. 4B shows trajectory error in y dimension for results from pilot CSE simulation according to an embodiment of the disclosure.

While MoBBE directly reduces bandwidth for communicating estimates of dynamic system state throughout the network, via collaborative state estimation (CSE) similar shared models leverage collaboration between agents to improve the quality of location estimates. Results from a simulation of CSE are shown in FIGS. 4A and 4B. FIG. 4A shows actual and estimated trajectories. FIG. 4B shows trajectory error in y dimension. In this simulation, two UAVs are flown from left to right at constant speed; their actual, individually estimated, and collaboratively estimated trajectories are plotted in FIG. 4A. The estimate errors in the y-direction are shown versus time in the right panel. Locations are individually estimated based on an EKF that fuses GPS, inertial and compass sensor data, all of which have measurement noise and biases. GPS is removed halfway through the trajectories, as indicated by the black diamonds in FIG. 4A. For collaborative estimation, the range between the two UAVs (e.g. as produced by pairs of QNT radios) is also incorporated into the EKF. The addition of this measurement, even with noise, has a dramatic impact on the y-direction estimation error, correcting the uncorrelated bias drifts in the inertial sensors. The benefits of CSE scale with the number of UAVs in the network by introducing geometric constraints in the relative locations of the vehicles that will dramatically reduce uncorrelated estimate errors. This approach does not correct systematic localization errors that are correlated across all agents, e.g. if all compasses are biased to the East. Such errors are relatively unlikely and could be reduced by other means, e.g. by using map features as fiducials. It is estimated that CSE will reduce the RMS errors in blue force location estimation by 50-80% for communicating networks of at least four aircraft in realistic missions.

Like CSE, collaborative target identification and localization (CTIL) uses shared dynamic models of potential objects that are informed by data from multiple sources. CTIL extends CSE by creating models of new actors based on known object templates, estimating object characteristics other than state, and forming estimates without any knowledge of the object's input signals (e.g. commands). CTIL provides a framework within which sensor data from different sensor types and perspectives may be fused onboard each participating agent. CTIL improves target classification performance by increasing the percentage of targets correctly identified with greater than 90% confidence, and reducing the time required to reach this confidence level per target. Performance improvements depend heavily on the details of each scenario and baseline performance level, but significant improvements are expected when different agents use different sensor modalities to measure different object signature types. By sharing target estimates and fusing them with models, we expect to reduce RMS stationary/moving target state estimation errors by 25-50% when four or more agents participate in localization, and to reduce the time from detection to 90% confident classification by 25-50%.

Ultimate performance is dramatically enhanced by enabling the system to autonomously generate sub-tasks that will contribute to larger pre-defined objectives, and execute the objective list adaptively in real-time even as conditions change. For example, if an operator-defined objective is to search for objects or targets, as agents detect possible target signatures in the operating space, they can automatically generate tasks e.g. to view potential target locations with sensors of different signatures. These new tasks are inserted with appropriate priority levels and cause assignments to immediately adjust as dictated by the real-time optimization algorithms. The performance improvement provided by this capability is quantified based on the number of actions required from a simulated operator, with and without the new capabilities. It is estimated that the number of operator actions will be reduced by 50-80% for typical missions.

Implementation details. In the following paragraphs, a detailed embodiment is described. In this embodiment, TE is applied to a team of collaborating unmanned aerial vehicles (UAV) with particular network protocols. The algorithms are primarily concerned with developing accurate shared models of UAV locations and states in real-time, as well as with identifying and locating targets.

MoBBE: UAV states are frequently shared point-to-point over TCP or UDP network protocols. Mesh networking simplifies routing for multi-hop networks, and topic-based middleware simplifies deploying complex interdependent systems. These advances simplify the robust routing of information; however, UAV state estimates are still produced at fixed rates and blindly transmitted at fixed rates, e.g. over a TCP socket or middleware topic. Mesh networking and topic-based middlewares determine how and where to send information. MoBBE adds a critical capability to determine when information actually needs to be sent, making it possible to efficiently transmit only necessary information and enabling dramatic bandwidth reductions.

Figure 5:
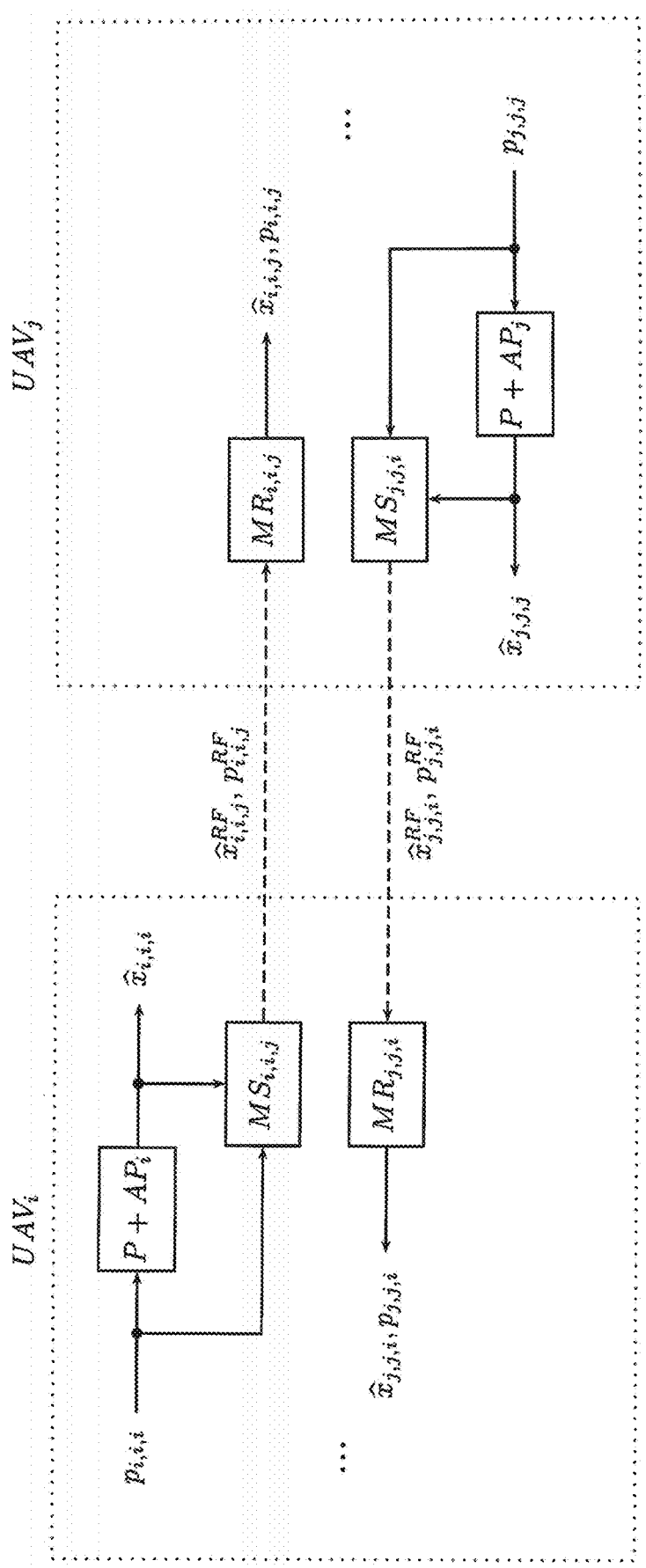
FIG. 5 is a schematic of MoBBE protocol for two communicating UAVs. Each includes a MoBBE sender (MS) and receiver (MR) according to an embodiment of the disclosure.

In MoBBE, each $UAV_i$ contains models for all other $UAV_j$'s, and vice versa. FIG. 5 shows a schematic representation of a pair of UAVs communicating using the MoBBE protocol. $p_{i,i,i}$ represents a planned path for $UAV_i$, generated by $UAV_i$, and currently stored on $UAV_i$; once transmitted to $UAV_j$ it becomes $p_{i,i,j}$ (for $UAV_i$, generated by $UAV_i$, stored on $UAV_j$). Each UAV includes a MoBBE sender (MS) and receiver (MR). The planned path is provided as an input to the platform and its native autopilot controller (P+$AP_i$), which typically performs state estimation as well as position/velocity control. The state estimate for $UAV_i$, measured by $UAV_i$, and stored on $UAV_i$, is $\hat{x}_{i,i,i}$; once transmitted to $UAV_j$ it becomes $\hat{x}_{i,i,j}$. A MoBBE Sender (MS) and Receiver (MR) pair include matched dynamic models and interface the vehicle control system to the radio hardware (messages transmitted wirelessly are indicated by the RF superscript). Not every state estimate message $\hat{x}_{i,i,i}$ will make it to the receiver $MR_{i,i,j}$ to become $\hat{x}_{i,i,j}$. In challenging environments, messages will be lost to interference or active denial.

The receiver on $UAV_j$ uses its stored model for $UAV_i$ and the previously received states and paths to predict where $UAV_i$ is, producing state estimates $\hat{x}_{i,i,j}$ at a constant rate despite intermittent receipt of $\hat{x}_{i,i,j}^{RF}$. This improves robustness, giving $UAV_j$ an idea of $UAV_i$'s state despite intermittent communications. The longer the receiver must predict with no corrections, the larger the prediction error and uncertainty will grow. Still, this is more accurate than using an outdated state as current (as traditional methods do). The MoBBE Sender $MS_{i,i,j}$ also knows the model, last transmitted state/path, and contains a prediction algorithm identical to $MR_{i,i,j}$. This key capability allows the sender to exactly model the receiver's prediction. The sender intentionally "drops" messages when the receiver's prediction is "good enough." Exceeding error and uncertainty thresholds triggers the sender to transmit updated data. MoBBE reduces bandwidth by only sending messages necessary to maintain allowable error and uncertainty at the receiver's output. These limits provide an adaptable tradeoff between bandwidth and error/uncertainty. As the available bandwidth increases, the error/uncertainty can be reduced, and vice versa.

In a collaborating system that includes multiple UMS, MS/MR pairs are established for each connection between operating UMSs. The MS and MR elements apply state of the art estimation algorithms. For example, a pilot MoBBE implementation used EKFs. Unscented Kalman filters (UKFs) and particle filters (PFs) are viable alternatives to EKFs which may produce more computationally efficient results. These are different embodiments of the estimation algorithms. These are types of estimation algorithms that incorporate models of the system dynamics. Such algorithms are well established and computationally efficient; running five MS/MR pairs on a single UAV (or other UMS) to manage collaboration for a team of 6 agents is not expected to significantly impact the computational resources available onboard typical available systems.

The primary goal and success metric for MoBBE is to reduce the average bandwidth utilized per connection by 80% to 90% when compared to a system with fixed-rate communications, with less than 20% increase in state estimation error for typical mission scenarios. Furthermore, MoBBE provides monotonic tradeoffs between bandwidth and RMS estimate error as well as bandwidth and estimate uncertainty. This enables the system to improve performance whenever bandwidth is available. MoBBE combines communications with model-based predictions to reduce the bandwidth consumed moving state information and improve the robustness of collaborating networks of UMS to communication failures.

CSE: Collaborative UMS networks typically require ubiquitous GPS for self-localization and high-availability communications for sending GPS-derived state estimates to all other UMSs. Many research demonstrations, particularly of multi-UAV collaborations, go even further, using advanced motion capture systems to deliver highly accurate full team state information to all agents in real time from a centralized system. Just as MoBBE helps address communication-denied environments, CSE uses similar model-based methods as well as data fusion from multiple sources to form improved team estimates in GPS-denied environments.

Figure 6:
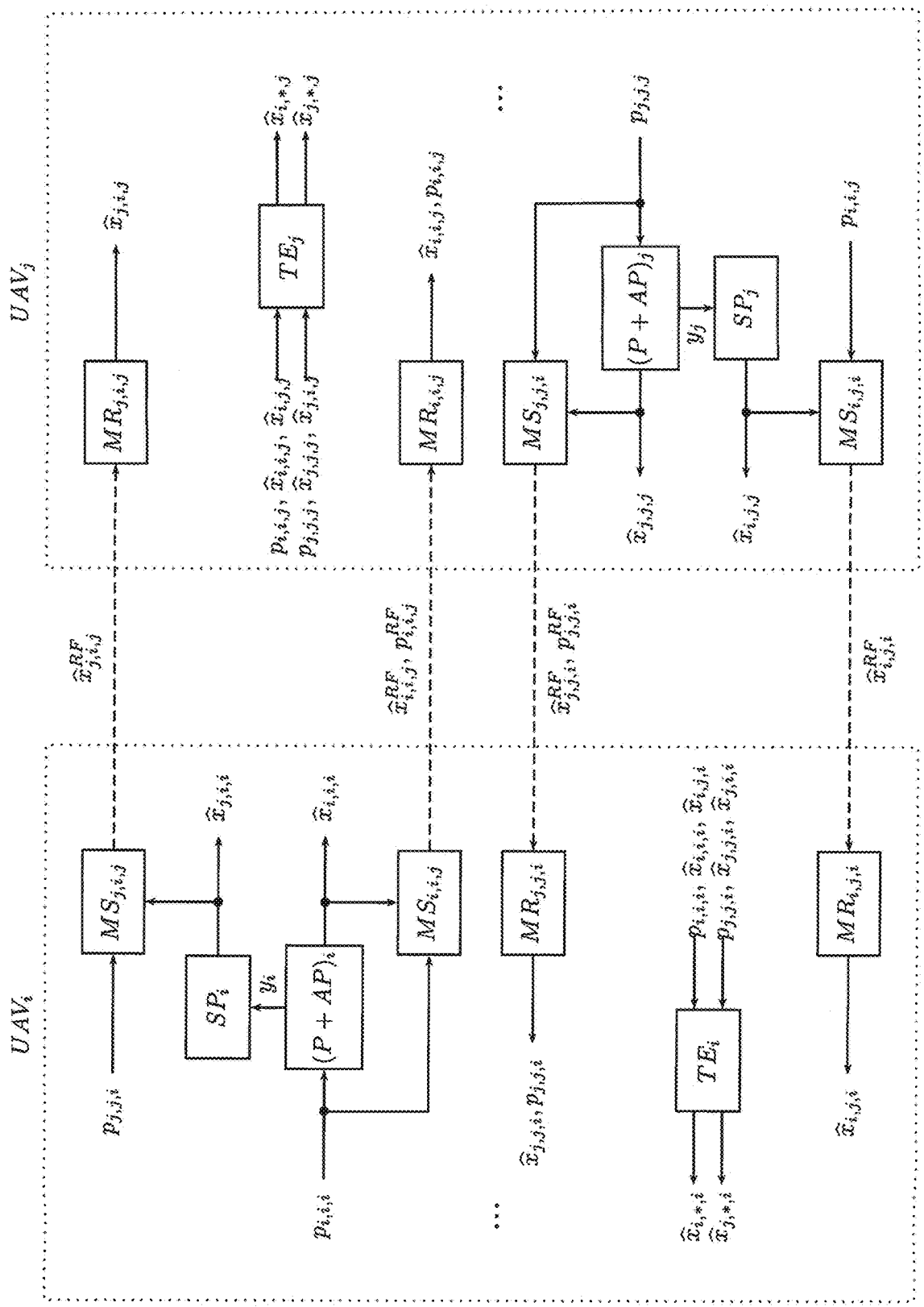
FIG. 6 is a schematic depiction of CSE implementation for two collaborating UAVs according to an embodiment of the disclosure.

FIG. 6 shows a schematic of a CSE system for two collaborating UAVs, including the MoBBE send/receive elements shown in FIG. 4. Each $UAV_i$ is equipped with the ability to estimate its own state, generally using a combination of methods including GPS (when available), inertial measurement, and sometimes other capabilities. Typically, these internal estimates are the only source of location measurement, and when GPS is unavailable and inertial measurements are the primary source of information, errors may accumulate. However, for collaborative missions, sensors (e.g. EO/IR, acoustic, LIDAR, QNT radio range data, and GPS from agents receiving signals) can provide additional measurements of teammate states. Sensor Processing $SP_i$ on $UAV_i$ can produce an estimate $\hat{x}_{j,i,i}$ describing $UAV_j$'s state, as measured by $UAV_i$, and stored on $UAV_i$. In one embodiment, this could be a vision-based estimate that is very accurate in bearing but highly uncertain in range, and/or a QNT radio-based estimate that is very accurate in range but highly uncertain in bearing. This information can then be communicated to $UAV_j$ (leveraging MoBBE to reduce bandwidth) so that $UAV_j$ can fuse all teammates' measurements with its own measurements to form an improved estimate $\hat{x}_{j,*,j}$. Estimate quality improves with the number of agents who contribute state information from different perspectives. Not only can team estimator $TE_i$ estimate $UAV_i$'s state, but it can use the communicated measurements to estimate the states of all agents. CSE algorithms leverage the same models and estimation algorithms as the MoBBE senders and receivers. CSE includes methods to automatically combine multiple measurements and measurement models within a robust and adaptable framework, making re-derivation of the EKF/UKF/PF unnecessary when a new UAV, other UMS or sensor modality joins the network. A preliminary implementation of CSE used EKFs. The primary goal and performance metric of CSE is to reduce the maximum error between the actual state xi and the team estimate state $\hat{x}_{i,*,i}$ by 50% (stretch target 80%) for scenarios involving high GPS denial (>50% area under denial on average) and a minimum team size of four agents, as compared to dead-reckoning based inertial localization without collaboration. CSE provides a framework for reaping the benefits of fusing data from different perspectives to improve localization estimates.

CTIL: CTIL addresses two problems simultaneously: the identification of objects/targets and the real-time localization of stationary or moving targets. Both are improved by fusing sensor data from multiple sensor modalities and perspectives and comparing with target-specific dynamic models. There are multiple techniques for detecting, classifying, identifying, and tracking resolved targets in EO/IR and other sensor feeds. Alternative methods are available to track large numbers of unresolved targets (a few pixels each) in a single wide area sensor feed (PMHT[5], R-RANSAC[6]). All of these techniques produce track estimates whose accuracy depends on the type, quality and location of the sensor from which they are derived. The algorithms developed for CSE can be adapted and extended to take in multiple measurements of an object or target $t_l$ from multiple UAVs to produce $\hat{t}_{l,i}$. In this case, the $\hat{t}_{l,i}$ variables include not only target state estimates but also signature characteristics. The UAVs may have varied sensors and/or locations, producing different estimated locations, classifications, and uncertainties of these estimates. The individual measurements can be fused together to form a more accurate and precise target estimate $\hat{t}_{l*i}$ based upon known models of potential targets' dynamics and signatures, including probabilistic estimates of object or target identity (e.g. a 30% chance a target is type #1 and a 70% chance it is type #2). The object or target models differ from the UAV models in that the target models must not contain exogenous inputs. While teammate UAVs may communicate their intended paths, objects that are not part of the collaborating team will not. This may require simplified target estimators, but multiple diverse measurements will result in improved target estimates. The ability to use templates of known potential objects (e.g. vehicles expected to be in the area) for particular mission environments will significantly improve target classification.

The primary performance metric for target localization is to reduce the maximum error between the actual target $t_l$ and the team estimated target $\hat{t}_{l*i}$ by 25% (stretch target: 50%) when compared to non TE-based data fusion. For target identification, the goal is to reduce the maximum time from detection to 90% confident classification by 25% (stretch target 50%) when compared to non-team data fusion.

Autonomous task generation and collaborative execution: To execute operations including 4-10 UMS agents operating under the control of a single multi-tasking operator, it is critical for the collaborating UMS team to be highly autonomous in executing high-level instructions, with only occasional operator input. This requires the team to adapt to new information in real time, and to decompose high level objectives into lower level tasks on the fly. This includes generating new tasks in response to sensor measurements. Even state-of-the-art research in collaborating UMS has not demonstrated these capabilities in complex mission scenarios. Virtually all research on collaborating unmanned systems focuses either on swarm/collective behaviors, or on simple waypoint visitation. Swarm behaviors generally work toward just one objective, treat agents as homogeneous, and rely on agent positioning as the primary task output (e.g. converging on a sensor source, formation flying, etc.). The most prominent multi-aircraft waypoint visitation methods generally assume quasi-static missions that allow significant advance planning or require intimate operator input and do not enable close real-time collaboration or dealing with active dynamic adversaries.

OCM capability allows objectives to be created by the operator and executed autonomously by layered, modular, distributed control algorithms. As OCM was specifically designed to support dynamic, tactical operations against active adversaries, agents are assigned to objectives automatically, and assignments are continually re-calculated and changed as needed, without operator intervention, to respond to events (e.g. fast-moving targets are handed off to fast vehicles to follow). Building on OCM, the autonomous task generation aspect of TE enables agents to generate new tasks that fulfill higher-order objectives based on estimates produced by the common models used for MoBBE, CSE and CTIL. High-level objectives are structured to include and explicitly allow the generation of particular sub-tasks. For instance, agents executing a "search for object/target types 1-4" objective are authorized to generate new tasking to bring particular sensors to bear on potential targets to improve shared model target identification. The uncertainty in the identification estimates, together with known template models of target type, are used to predict what type of sensor would most reduce the uncertainty, and tasking is generated accordingly. This powerful capability relieves the operator of the need to monitor all of the UMS sensor feeds in real-time for possible targets and generate corresponding tasking.

Performance of this radical new capability is best quantified by the extent to which interactions with an operator are relieved. We expect that the number of actions required by the (simulated) operator will be reduced by at least 50% (stretch goal: 80%) by integrating these features, while target identification speed and accuracy will improve or stay constant, for typical missions, when compared to a baseline OCM system that does not include automatic task generation.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for controlling multiple unmanned, autonomous vehicles during a mission, comprising:
   executing in each of the multiple unmanned, autonomous vehicles a dynamic mission model that outputs one or more mission parameters comprising reducing the communication bandwidth needed to maintain a selected quality of shared estimate of system state;
   wherein each of the multiple unmanned, autonomous vehicles continuously simulate the dynamic mission model of the multiple unmanned, autonomous vehicles in the mission;
   wherein one or more of the multiple unmanned, autonomous vehicles changes its mission operation control based on the output one or more mission parameters;
   wherein the mission parameter further comprises a new state estimate through collaborative data fusion in the absence of GPS or other low uncertainty localization sensors;
   wherein the dynamic mission model further comprises a model-based bandwidth efficient communications protocol that exchanges reduced bandwidth for increased distributed computation; and
   wherein the dynamic mission model further comprises a collaborative target identification and localization process that fuses sensor data from the two or more unmanned, autonomous vehicles to identify and locate a target.

2. The method of claim 1, wherein the dynamic mission model further comprises a collaborative state estimation process that fuses data from the two or more unmanned, autonomous vehicles of the multiple unmanned, autonomous vehicles to reduce uncorrelated errors in autonomous vehicle location estimates.

3. The method of claim 1, wherein the dynamic mission model further comprises an automated task generation process that enables two or more unmanned, autonomous vehicles of the multiple unmanned, autonomous vehicles to generate a new task.

4. The method of claim 3, wherein the new task is bringing particular sensors to bear on potential targets to improve shared model target identification.

5. An unmanned, autonomous vehicle system, comprising: two or more unmanned, autonomous vehicles, each of the two or more unmanned, autonomous vehicles comprising a processor for executing instructions that outputs one or more mission parameters to one or more other unmanned, autonomous vehicles based on a dynamic mission model of the unmanned, autonomous vehicle system operating on each of the two or more unmanned, autonomous vehicles, the outputs comprising reducing the communication bandwidth needed to maintain a selected quality of shared estimate of system state;
   wherein the two or more unmanned, autonomous vehicles each continuously simulate the dynamic mission model of the two or more unmanned, autonomous vehicles in an assigned mission;
   wherein one or more of the multiple unmanned, autonomous vehicles changes its mission operation control based on the output one or more mission parameters;
   wherein the mission parameter further comprises a new state estimate through collaborative data fusion in the absence of GPS or other low uncertainty localization sensors;
   wherein the dynamic model further comprises a model-based bandwidth efficient communications protocol that exchanges reduced bandwidth for increased distributed computation; and
   wherein the dynamic mission model further comprises a collaborative target identification and localization process that fuses sensor data from the two or more unmanned, autonomous vehicles to identify and locate a target.

6. The unmanned, autonomous vehicle system of claim 5, wherein the dynamic mission model further comprises a collaborative state estimation process that fuses data from the two or more unmanned, autonomous vehicles to reduce uncorrelated errors in autonomous vehicle location estimates.

7. The unmanned, autonomous vehicle system of claim 5, wherein the dynamic mission model further comprises an automated task generation process that enables the two or more unmanned, autonomous vehicles to generate a new task.

8. The unmanned, autonomous vehicle system of claim 7, wherein the new task is bringing particular sensors to bear on potential targets to improve shared model target identification.

9. The unmanned, autonomous vehicle system of claim 5, wherein the unmanned, autonomous vehicle is an unmanned, autonomous air vehicle.

10. A system, comprising:
    an operator command and control station;

a communications network linked to the operator command and control station;

two or more unmanned, autonomous vehicles that receive mission instructions from the operator command and control station via the communications network;

wherein the two or more unmanned, autonomous vehicles each comprise a processor for executing instructions that outputs one or more mission parameters to one or more other unmanned, autonomous vehicles based on a dynamic mission model of the system operating on each of the two or more unmanned, autonomous vehicles, the outputs comprising reducing the communication bandwidth needed to maintain a selected quality of shared estimate of system state;

wherein the two or more unmanned, autonomous vehicles continuously simulate the dynamic mission model of the two or more unmanned, autonomous vehicles in the mission;

wherein one or more of the multiple unmanned, autonomous vehicles changes its mission operation control based on the output one or more mission parameters;

wherein the mission parameter further comprises a new state estimate through collaborative data fusion in the absence of GPS or other low uncertainty localization sensors;

wherein the dynamic mission model further comprises a model-based bandwidth efficient communications protocol that exchanges reduced bandwidth for increased distributed computation; and wherein the dynamic mission model further comprises a collaborative target identification and localization process that fuses sensor data from the two or more unmanned, autonomous vehicles to identify and locate a target.

11. The system of claim 10, wherein the dynamic mission model further comprises a collaborative state estimation process that fuses data from the two or more unmanned, autonomous vehicles to reduce uncorrelated errors in autonomous vehicle location estimates.

12. The system of claim 10, wherein the dynamic mission model further comprises an automated task generation process that enables the two or more unmanned, autonomous vehicles to generate a new task.

13. The system of claim 12, wherein the new task is bringing particular sensors to bear on potential targets to improve shared model target identification.

14. The system of claim 10, wherein the two or more unmanned, autonomous vehicles are unmanned, autonomous air vehicles.

* * * * *